L. H. FISHER.
Lubricating Axles for Vehicles.
No. 133,769. Patented Dec. 10, 1872.
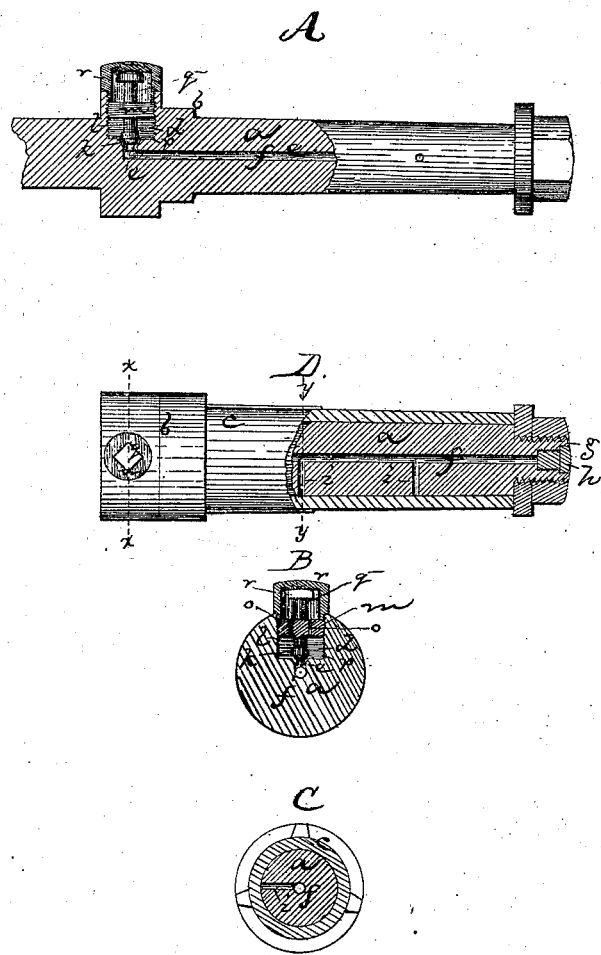
WITNESSES.
Mo. W. Frothingham.
L. H. Latimer.
INVENTOR.
Lewis H. Fisher,
By his Attys.
Crosby & Gould

UNITED STATES PATENT OFFICE.

LEWIS H. FISHER, OF WALPOLE, MASSACHUSETTS.

IMPROVEMENT IN LUBRICATING-AXLES FOR VEHICLES.

Specification forming part of Letters Patent No. 133,769, dated December 10, 1872.

*To all whom it may concern:*

Be it known that I, LEWIS H. FISHER, of Walpole, in the county of Norfolk and State of Massachusetts, have invented an Improved Self-Oiling Carriage-Axle; and I do hereby declare that the following, taken in connection with the drawing which accompanies and forms part of this specification, is a description of my invention sufficient to enable those skilled in the art to practice it.

The invention relates to the construction of carriage-axles with particular reference to such arrangement of an oil-chamber and passages leading therefrom, and devices for regulating the flow of the oil, that the outer surface of the axle against which the hub-bushing rotates may be kept constantly and sufficiently, but not excessively, lubricated.

In my construction I make, in the circular flange which forms the shoulder against which the hub sleeve or bushing bears, an oil cup or chamber, from which opens an axial passage extending nearly or quite through the part of the axle upon which the bushing runs, a series of radial passages running from this central passage to the periphery or outer surface of the axle. In the chamber is a regulating device, by adjustment of which the flow of oil may be graduated; and over this regulator may be placed a screw-cap, by fixing which the regulator-plug is kept from accidental movement.

My invention consists not only in the axle made with such oil-chamber and axial and radial passages, the flow of oil being regulated by a suitable plug, but also in the employment of the screw-cap, serving as a check-cap to keep the regulator-plug in position.

The drawing represents an axle embodying my invention. A shows the axle in side and sectional elevation. B is a cross-section on the line *x x*. C is a cross-section on the line *y y*. D is a plan and section.

*a* denotes the axle; *b*, the flange or shoulder, against which the bushing *c* abuts. *d* denotes the oil reservoir or chamber, bored down into the axle, and having at its bottom a center passage, *e*, into or from which leads the axial passage *f*, bored centrally into the axle from the outer end *g* to the chambers *d e*, the end of the axial passage being closed by a screw or plug, *h*. Leading from the passage *f* are three or any other suitable number of small ducts or passages, *i*, extending to the outer surface of the axle. Into the outlet-hole *e* of the oil-chamber extends a valve, *k*, on a stem, *l*, projecting from a screw-plug, *m*, through which plug are several holes, *o*, for free passage of the oil to the main cup or reservoir *d*, this plug turning in a nut-thread, *p*, formed around the chamber. From the outer side of the plug extends a stem, *q*, and by turning the plug by means of this stem the valve is raised more or less from the discharge-orifice *e*, the oil flowing freely through the plug-holes, but to an extent limited by the position of the screw and valve, the oil running from the chamber *d* into and through the axial passage *f*, and from said passage into and through the laterals *i* to the outer surface, or the surface to be lubricated.

By these means a carriage or wagon axle may be kept lubricated for many months without resupply of oil or attention, the plug and valve being so arranged as to deliver the oil sufficiently for lubrication, but not so that it will flow excessively.

Over the plug-stem *q* is the cap *r*, which screws into the top of the chamber *d* and down against the top of the stem, the contact of the cap preventing accidental turning of the screw-plug, and thereby enabling the flow of oil to the axle to be kept constant without danger of too great or too little flow by any accidental movement of the plug, the cap obviating any necessity for inspecting the cup to ascertain the discharge of oil.

The lateral or radial ducts *i* are shown as extending horizontally from the axle; but it will be obvious they may be otherwise arranged.

I am aware that self-lubricating axles have been made with an axial oil-passage having radial passages communicating therewith, and that oil-cups have been used applied to the outside of an axle. These I do not claim; but

I claim—

1. An oil-reservoir or supply-chamber located within the axle-collar and feeding therefrom, the axial or central passage, and the outlet-passages in the axle or spindle, substantially as shown and described.

2. In combination with the oil-chamber in the collar and with its oil-passages, the inner regulating screw-plug $m$ and the adjustable check-cap $r$, the construction being such that the inner face of the cap may bear down upon the top of the plug and hold the same to place, substantially as shown and described.

LEWIS H. FISHER.

Witnesses:
 FRANCIS GOULD,
 M. W. FROTHINGHAM.